(12) United States Patent
Pinto et al.

(10) Patent No.: US 9,771,727 B2
(45) Date of Patent: *Sep. 26, 2017

(54) SYSTEM FOR FORMING FLOOR UNDERLAYMENT

(71) Applicants: Akiva Pinto, Jerusalem (IL); Chad A. Collison, Pierce, NE (US)

(72) Inventors: Akiva Pinto, Jerusalem (IL); Chad A. Collison, Pierce, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,346

(22) Filed: Feb. 22, 2017

(65) Prior Publication Data

US 2017/0159301 A1  Jun. 8, 2017

Related U.S. Application Data

(60) Continuation of application No. 15/212,523, filed on Jul. 18, 2016, now Pat. No. 9,580,917, which is a continuation of application No. 14/459,590, filed on Aug. 14, 2014, now Pat. No. 9,394,690, which is a division of application No. 13/303,561, filed on Nov. 23, 2011, now Pat. No. 8,808,826.

(51) Int. Cl.
| | |
|---|---|
| *E04F 15/18* | (2006.01) |
| *B32B 37/14* | (2006.01) |
| *B32B 5/02* | (2006.01) |
| *B32B 37/12* | (2006.01) |
| *E04F 15/20* | (2006.01) |
| *E04F 15/04* | (2006.01) |

(52) U.S. Cl.
CPC ............. *E04F 15/18* (2013.01); *B32B 5/02* (2013.01); *B32B 37/12* (2013.01); *B32B 37/14* (2013.01); *B32B 2260/021* (2013.01); *B32B 2307/7246* (2013.01); *B32B 2471/04* (2013.01); *E04F 15/04* (2013.01); *E04F 15/20* (2013.01)

(58) Field of Classification Search
CPC .......... E04F 15/182; E04B 1/665; E04C 2/16; E04C 2/243; E04C 2/246; B32B 21/10; B32B 2260/021; B32B 2262/02; B32B 2307/7246; B32B 2471/04; Y10T 428/237; Y10T 428/24967; Y10T 428/253; Y10T 428/254; Y10T 428/26; Y10T 428/265; Y10T 428/249921; Y10T 156/1067; Y10T 156/1087; Y10T 442/60
USPC ........................................ 428/215
See application file for complete search history.

(56) References Cited

U.S. PATENT DOCUMENTS

| | | | |
|---|---|---|---|
| 4,684,489 A | 8/1987 | Walter | |
| 6,562,173 B1 | 5/2003 | Collison et al. | |
| 6,986,229 B2 | 1/2006 | Collison et al. | |
| 7,458,317 B2 | 12/2008 | Sebastian et al. | |
| 8,808,826 B2 * | 8/2014 | Pinto ..................... | E04C 2/16 156/259 |
| 9,394,690 B2 * | 7/2016 | Pinto ..................... | E04C 2/16 |
| 9,580,917 B2 * | 2/2017 | Pinto ..................... | E04C 2/16 |
| 2004/0172905 A1 | 9/2004 | Collison | |

FOREIGN PATENT DOCUMENTS

WO    WO00/06353    2/2000

OTHER PUBLICATIONS

International Search Report for PCT/US2012/066240, dated Feb. 28, 2013.
Written Opinion of the International Searching Authority for PCT/US2012/066240, dated Feb. 28, 2013.

* cited by examiner

*Primary Examiner* — Leszek Kiliman
(74) *Attorney, Agent, or Firm* — Harness, Dickey & Pierce, P.L.C.

(57) ABSTRACT

A process for making a fibrous panel member and a flooring structure is disclosed. The flooring structure has a subfloor, a surface layer, and an insulative pad disposed between the subfloor and the surface layer. The insulative pad has an MDI binder and reinforcement fibers distributed uniformly and randomly within a first plane. The process includes mixing a porous fiber material with a MDI adhesive. The fiber batt is compressed between a pair of porous belts. Steam and heat are applied to the compressed batt to form a bound flexible batting material.

16 Claims, 2 Drawing Sheets

SYSTEM FOR FORMING FLOOR UNDERLAYMENT

CROSS-REFERENCE TO RELATED APPLICATIONS

This application is a continuation of U.S. patent application Ser. No. 15/212,523, filed Jul. 18, 2016, which is a continuation of U.S. patent application Ser. No. 14/459,590 filed on Aug. 14, 2014, now U.S. Pat. No. 9,394,690 issued Jul. 19, 2016, which is a divisional of U.S. patent application Ser. No. 13/303,561 filed on Nov. 23, 2011, now U.S. Pat. No. 8,808,826 issued Aug. 19, 2014. The entire disclosures of the above applications are incorporated herein by reference.

FIELD

The present disclosure relates to a system and process for making a flexible textile fibrous matt underlayment and, more particularly, to a machine that can be used to selectively form a flexible textile fibrous batt pad using either adhesive, or alternatively heat, to bind the fibers.

BACKGROUND

This section provides background information related to the present disclosure which is not necessarily prior art. Example embodiments will now be described more fully with reference to the accompanying drawings. As indicated above, processes for preparing floor underlayment, such as medium density floor underlayment, are known to those skilled in this art.

Textile pads are widely used in flooring applications. A pad is desirable when wood flooring is applied over sub flooring. These pads used in flooring applications serve multiple purposes. They may absorb impact, such as from persons walking on the flooring. They may provide sound deadening, and may provide insulating properties against heat transfer. Pads also may accommodate roughness, unevenness, or other flaws in the sub flooring, and may provide a barrier against moisture and dirt. Finally, pads may lessen impact stresses on the flooring to lengthen the life of the flooring and make the flooring appear to be more durable and of a higher quality. Traditionally, these pads are formed when fibers of various sizes and materials are mixed and bound together. The binding can occur using know techniques such as needling or by the use of meltable binder fibers such as polypropylene. These techniques, while functional have several disadvantages which lead to slow throughput, high energy and cost, and environmental emissions.

As stated above, the teachings herein broadly relates to forming textile fiber matt, and particularly medium density fiber matt. Processes for production of medium density fiber matt are well known to the skilled artisan and include the blowline addition of isocyanate binders. Such a process is described, generally, below.

SUMMARY

This section provides a general summary of the disclosure, and is not a comprehensive disclosure of its full scope or all of its features. The present teaching discloses a method for producing a floor underlayment. The method includes providing textile fibers to a blowline. Optionally, polymeric MDI containing binder having a diisocyanate content of less than about 20% by weight is mixed with the textile fibers in the blowline to treat the textile fibers. The fiber/MDI is at least partially dried. The treated fibers are pressed and subjected to steam to activate the adhesive and bind the fibers to provide a flexible textile batt.

According to the teachings above, the polymeric MDI containing binder can have a diisocyanate content of about 10% by weight or less which allows for a flexible and, therefore, rollable textile product.

According to the teachings above, wherein the polymeric MDI containing binder has a diisocyanate content of about 8% by weight or less.

According to the teachings above, wherein the polymeric MDI containing binder has a diisocyanate content of about 6% by weight or less.

According to the teachings above, wherein the polymeric MDI containing binder is emulsifiable. Further areas of applicability will become apparent from the description provided herein. The description and specific examples in this summary are intended for purposes of illustration only and are not intended to limit the scope of the present disclosure.

According to the present teachings, a flooring material having a textile pad substructure with a density of greater than 13 pounds per cubic foot is provided according to a first aspect of the teachings. The insulative textile flooring pad has reinforcement fibers and a MDI binder.

Further, a flooring structure is disclosed. The flooring structure has a subfloor, a surface layer, and an insulative pad disposed between the subfloor and the surface layer. The insulative pad has MDI binder and reinforcement fibers distributed uniformly and randomly within a first plane. The fiber pad can be water resistant and be flexible and elastically deformable under its own weight.

Further disclosed is a floor underlayment for disposal under a floor surface. The floor underlayment has less than 8% by weight MDI adhesive and more than 85% reinforcement fibers. The floor underlayment has a first surface disposed adjacent to the floor surface and has a density of greater than 13.3 pounds per cubic foot.

Further disclosed is an apparatus for forming a plurality of textile pads from a textile batt according to another aspect of the invention. The apparatus comprises a pair of feed rollers for receiving a textile batt and an adhesive activator positioned upstream of the pair of feed rollers that is capable of activating an adhesive on a portion of the fibers. A vapor barrier supply is optionally positioned downstream of the adhesive activator that is capable of supplying vapor barrier material that contacts the outer surfaces of the partial thickness textile batts, and pressure rollers positioned downstream of the vapor barrier supply that are capable of partially compressing the partial thickness textile batts to bond to the vapor barrier to the fibers.

DRAWINGS

The drawings described herein are for illustrative purposes only of selected embodiments and not all possible implementations, and are not intended to limit the scope of the present disclosure.

DETAILED DESCRIPTION

Figure 1:
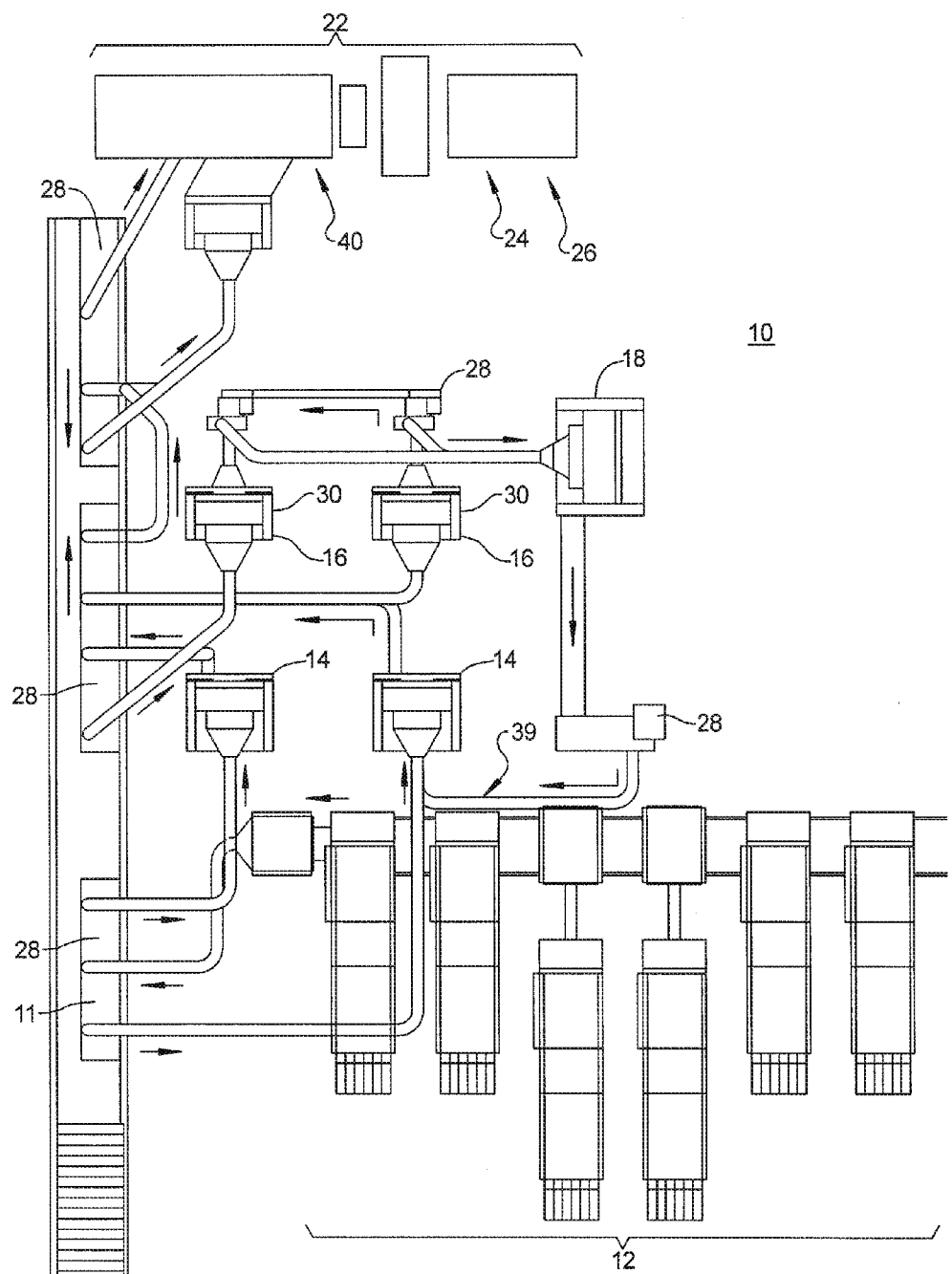
FIG. 1 represents the system according to the present teachings.
Figure 2:
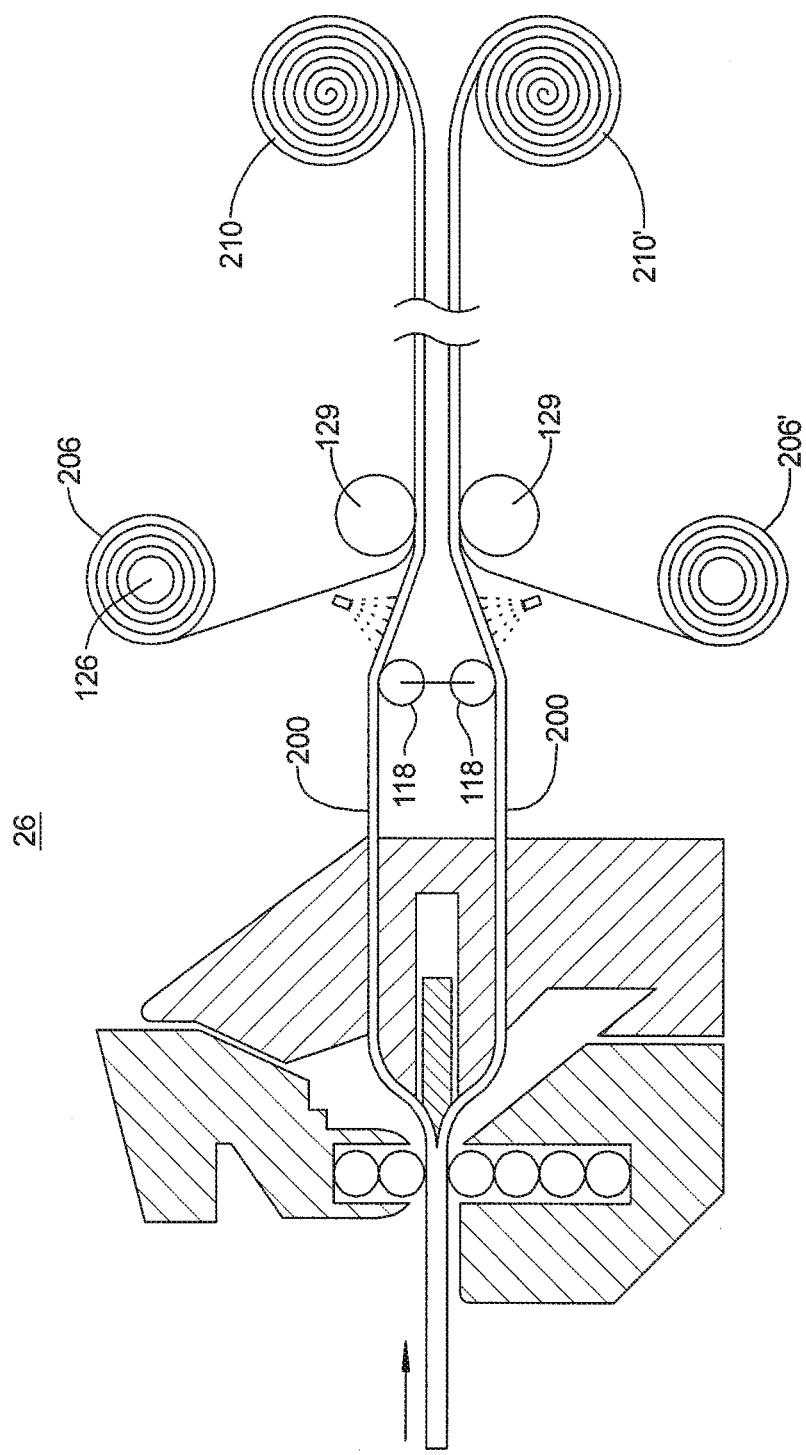
FIG. 2 represents a forming machine used in the system shown in FIG. 1.

FIG. 1 represents a system for forming a floor underlayment according to the present teachings. The system 10 can be generally divided into blending operations 12, mixing operations 14, fine opening operations 16, adhesive application operations 18, adhesive tempering operation 20, forming operation 22, adhesive activation operation 24, and splitting and rolling 26.

The system has a first section 6 which is issued to form a textile fiber matt which has reinforcement and binding fibers and a second section 8 which uses an adhesive binder to form the textile fiber matt. As such, an aperture is able to selectively run the first section 6 to form a fiber batt using binding fibers or the second section to form the batt using an adhesive.

In producing medium density fiber matt, a polyisocyanate resin is applied directly to the textile fiber material in the fiber transportation system of the refiner of a fiber matt manufacturing plant. Generally, fibrous textile materials used to form the batt are first screened to remove therefrom both oversized and undersized material, e.g., fines and dirt. The textile fibers also can be subjected to a preliminary washing step.

The cleaned fibers are conveyed to storage bins that feed pressurized fibers into a blending operation 12, which can be of a conventional design. The blending operation 12 refines the raw textile fiber material into fiber under air pressure of gravity feed. Generally, the blending operation 12 is usable for both the first 6 and second 8 sections of the system 10. In this regard, the blending operation 12 can be used to vary the mixture of the fibers depending on the material properties of the final product. The fibers pass from the blending operation 12 into the refining section while still under pressure, and this pressure is maintained during the mixing operation 14. A baffle 11 is then used to direct the fiber to individual mixing machines assigned to the first 6 or second 8 system section.

In the blending operation 12, textile fibers of varying denier, length and materials are combined in the mixing operation 14 into a generally randomly distributed mixture. The constituents of the fibers can be natural such as cotton, wool or jute, or they may be polymer based, for example nylon, polyester, etc. A loose fibrous mixture of fibers is transported through the system using a series of transport blowers 28. After the mixing operation 14, the fibers are transferred to a fine opening machine 30 which opens the fibers and prepares them for adhesive application.

Once opened, the fibers are again transported via a transport blower 28 to the adhesive application operation 18. At this operation, the temperature of the fibers is elevated an adhesive such as MDI is applied to the mixed opened fibers. While the percentage of MDI applied can be varied based on the required density of the end product, it is envisioned that less than 20% and, more particularly, less than 10% and, even more particularly, 4-7% by weight MDI can be applied to the fibers to allow the matt to be flexible.

After application of the MDI adhesive, the fiber adhesive mixture is transferred to a drying conveyor. The drying conveyor allows an initial cooling of the fiber adhesive mixture. After drying, the fiber adhesive mixture is again mixed to ensure proper distribution of the adhesive throughout the fibers.

The fibers are then passed through a cooled transfer tube 39 and cooled to room temperature. The cooled transfer tube 39 drops the temperature of the adhesive cooled fibers. After chilling, the fibers are again mixed at the mixing operation and transported to the forming machine 40. The forming machine uses a belt or vibrating hopper to evenly distribute the coated fibers onto a transport screen mesh. The fibers are heated to about 60° C. and formed into a non-compressed continuous slab. The material is weighed to ensure proper density and thickness of the finished product. Prior to compression, a release agent is sprayed onto the exterior surface of the batt to prevent the sticking of the batt to the conveyor belts. The release agent can be from the group consisting of soaps, fatty acids, waxes, silicones, and fatty acid salts.

An application of from about 1 to 20% MDI, preferably from about 2 to 10%, and more preferably from about 4 to 7%, based on the oven dry weight of the fiber is generally employed. The batt formed has material properties described in U.S. Pat. No. 6,986,229, incorporated herein by reference.

Significantly faster line speeds have been achieved with the low volume polymeric MDI-containing binders of the present invention—a significant cost savings. In addition, the polymeric MDI-containing binders of the invention result in superior physical and mechanical properties in the resulting fiber matt product. For example, floor underlayment with higher internal bond strength and reduced edge swelling can be produced as compared to floor underlayment produced with conventional, commercially available polymeric MDI-containing binders as described in U.S. Pat. No. 6,562,173, herein incorporated by reference. Optionally, binding in the matt can be accomplished using both binder fibers and an MDI adhesive.

Optionally, the system can use a pair of vapor barrier supply rollers 126 are also located downstream of the tension rollers 118 and serve to supply a vapor barrier layer 206' and 206 to each of the two partial thickness pads 200' and 200. The vapor barrier preferably is a plastic sheet material, typically about ½ to about 1 mil in thickness. The vapor barrier, as the name implies, prevents the travel of vapor (usually water vapor) through the textile pads 210' or 210. In the preferred embodiment, the vapor barrier layers 206' and 206 is coextruded polyethylene, but alternatively any flexible vapor barrier of a suitable thickness may be used.

The pair of pressure rollers 129 are downstream of the adhesive appliers 123 and the vapor supply rollers 126. The pair of pressure rollers 129 bring together the two partial thickness pads 200' and 200 and the two vapor barrier layers 206' and 206 to form the two textile underlayment pads 210' and 210. The pair of pressure rollers 129 heat and partially compress the batts during the bonding of the adhesive to form the two textile underlayment pads 210' and 210.

In the preferred embodiment, the pressure rollers 129 apply about 400 psi (pounds per square inch) of pressure to the two partial thickness textile pads 200' and 200 and to the vapor barrier layers 206' and 206. In addition, the pressure rollers 129 are maintained at a temperature of about 200 degrees Fahrenheit. The heating partially softens or breaks down the vapor barrier to make it pliable and to aid in penetration of the vapor barrier by the adhesive.

Downstream of the pressure rollers 129 is a pair of take-up rollers 132. The pair of take-up rollers 132 may be used to roll up the finished textile underlayment pads 210' and 210. The finished textile underlayment pads 210' and 210 may be used as a floor underlayment, a laminate floor underlayment, as part of a paint drop cloth, etc.

Each sample binder was emulsified with water at an about 1:1 ratio by weight and injected into the blowline to treat the fibers by mixing the fibers with the emulsified sample binders. During this stage, the flow rate through the blowline was about 100 Kg per hour and the emulsified sample binder flow rate was about 100 g per minute. After treating the fibers with the emulsified sample binders, the treated fibers were passed through an about 2.7 meter diameter by about 89 meter in length flash-tube dryer at temperatures of about 90° C. inlet and about 55° C. outlet temperature, thus reducing the moisture content of the treated fibers to about 12 to 14 percent (oven dry basis, which was calculated by dividing the weight of the dried by the weight of the water in the wet and multiplying by 100).

The continuous slab is transported to an oven where the slab is heated and compressed between two porous conveyor belts. Steam is applied through the belts to activate the MDI adhesive. The above-described process of forming medium density fiber matt is intended to be illustrative and should not be construed as limiting the present invention.

The dried, treated fiber was then collected in a storage bin prior to matt formation. Matts were then formed, weighed and pre-compressed on a continuous compression belt on line to consolidate the fiber matts, and cut to press-length size. Next, the pre-compressed matts were subjected to a final pressing step in a heated press consisting of porous belts which were each covered with release agent. The closing of the press consisted of a two-stage close, followed by a hold at final position, and then a decompression stage to allow for a slow release of steam pressure. The floor underlayment was pressed to a thickness of about 2.5 to 10 mm. The final product is flexible inasmuch as it is rolled prior to shipment.

The test floor underlayment was then each tested for physical and mechanical properties in accordance with ASTME90-97, ASTME413-97. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Additionally, the density of the fiber batt can vary through the textile product. In this regard, the MDI matt can have a higher density on outside surfaces of the matt.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for producing a textile fiber matt comprising:
    a) providing fibers into a blowline;
    b) providing a liquid adhesive having a content of less than about 20% by Weight of the fibers into the blowline to treat the fibers;
    c) pressing the fibers to form a flexible fiber matt having a compression resistance at a compression of 25% of the original thickness of greater than about 20 psi.

2. The method of claim 1, wherein providing a liquid adhesive having a content of less than about 20% by weight to the blowline comprises providing a liquid polymeric MDI containing adhesive having a diisocyanate into the blowline.

3. The method of claim 2, wherein the polymeric MDI containing adhesive has a diisocyanate content of about 8% by weight or less.

4. The method of claim 2, wherein the polymeric MDI containing adhesive has a diisocyanate content of about 6% by weight or less.

5. The method of claim 2, wherein the liquid polymeric MDI containing adhesive is emulsifiable.

6. The method of claim 5, wherein the emulsifiable polymeric MDI containing adhesive is emulsified.

7. The method of claim 1, wherein the flexible fiber matt is water repellent.

8. A method for producing a fiber matt comprising:
   a) providing fibers selected from the group consisting of polyethylene, polyester, polypropylene, and mixtures thereof to a blowline;
   b) providing adhesive binder into the blowline;
   c) mixing an adhesive binder in the blowline to treat the fibers to form a mixture having less than 8% by weight adhesive binder and more than 85% by weight textile fibers; and
   d) pressing the treated fibers to form a flexible textile fiber matt having a compression resistance at a compression of 25% of the original thickness of greater than about 20 psi.

9. The method of claim 8, wherein the adhesive binder has a diisocyanate content of about 8% by weight or less.

10. The method of claim 8, wherein the flexible textile fiber matt comprises an adhesive binder content of about 6% by weight or less.

11. The method of claim 8, further comprising mixing an isocyanurate adhesive binder with the textile fibers in the blow line.

12. The method of claim 8, further comprising mixing natural fibers with the textile fibers in the blow line.

13. A method for producing a textile fiber matt comprising:
   a) providing fibers selected into a blowline;
   b) providing binder into the blowline to form a mixture of fibers and binder; and
   c) pressing the fibers in the presence of heat to form a flexible textile fiber matt having a density of greater than about 13.3 pounds per cubic foot and having a compression resistance at a compression of 25% of the original thickness of greater than about 20 psi and mixture having less than 8% by weight binder and more than 85% by weight textile fibers.

14. The method of claim 13, further comprising providing an adhesive binder having a diisocyanate content of about 10% by weight or less into the blowline.

15. The method of claim 13, further comprising mixing an adhesive binder in the blowline to treat the fibers to form a mixture having less than 8% by weight adhesive and more than 85% by weight fibers.

16. The method of claim 13, wherein the fibers comprise natural fibers.

\* \* \* \* \*

UNITED STATES PATENT AND TRADEMARK OFFICE
CERTIFICATE OF CORRECTION

PATENT NO.          : 9,771,727 B2
APPLICATION NO.     : 15/439346
DATED               : September 26, 2017
INVENTOR(S)         : Akiva Pinto et al.

It is certified that error appears in the above-identified patent and that said Letters Patent is hereby corrected as shown below:

In the Claims

Column 6, Line 59, In Claim 1, delete "Weight" and insert --weight-- therefor

Column 8, Line 3, In Claim 11, delete "blow line" and insert --blowline.-- therefor Column 8, Line 5, In Claim 12, delete "blow line." and insert --blowline.-- therefor Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*